United States Patent [19]

McLean et al.

[11] 4,028,487

[45] June 7, 1977

[54] CABLE TERMINATOR AND GROUNDING UNIT

[76] Inventors: William B. McLean, 62 Pine Valley; Edward P. McLean, Box 626, both of Moultrie, Ga. 31768

[22] Filed: June 21, 1976

[21] Appl. No.: 698,053

[52] U.S. Cl. .............................. 174/78; 174/84 C
[51] Int. Cl.² ................... H02G 15/02; H01R 5/10
[58] Field of Search ............ 174/71 R, 71 C, 72 R, 174/75 C, 78, 84 C, 88 C, 89; 339/13, 14 R, 14 L, 276 R, 276 D, 276 S; 403/274, 275, 278, 281, 284, 285

[56] References Cited

UNITED STATES PATENTS

| | | | |
|---|---|---|---|
| 3,349,165 | 10/1967 | Zimmerman | 174/78 X |
| 3,639,677 | 2/1972 | Bain | 174/78 X |

FOREIGN PATENTS OR APPLICATIONS

| | | | |
|---|---|---|---|
| A94,562 | 8/1969 | France | 174/78 |
| 1,323,696 | 7/1973 | United Kingdom | 174/78 |

Primary Examiner—Laramie E. Askin
Attorney, Agent, or Firm—Newton, Hopkins & Ormsby

[57] ABSTRACT

A terminator and grounding device particularly for an underground distribution cable having a concentric grounded neutral. A deformable metal sleeve has an annular space between side wall portions thereof to receive and terminate the helically wound neutral conductor. A steel liner in the deformable metal sleeve resists crushing and provides a through passage for the insulated distribution conductor. A tubular deformable metal side gripper on the main sleeve receives an extrinsic ground wire.

4 Claims, 2 Drawing Figures

CABLE TERMINATOR AND GROUNDING UNIT

BACKGROUND OF THE INVENTION

Terminating and grounding devices for sheathed coaxial cables are known in the prior art and some examples of the prior art are U.S. Pat. Nos. 3,349,165; 3,446,910 and 3,897,127.

The present invention has for its objective to improve upon the prior art particularly in relation to a certain class of residential underground distribution systems which employ a solid or stranded inner conductor and an external grounded neutral conductor which is applied helically over the insulation of the inner high potential conductor. Such a cable is basically a two wire conductor, as distinguished from a coaxial cable having a multi-strand braided conductor sheath which requires grounding.

The invention is characterized by extreme simplicity of construction, convenience of installation and economy of manufacture. While it is more suited to the particular class of two conductor cable noted above, it may also be employed to terminate and ground other forms of shielded conductors. The features and advantages of the invention will be understood by those skilled in the art during the course of the following description.

DETAILED DESCRIPTION

Figure 1:
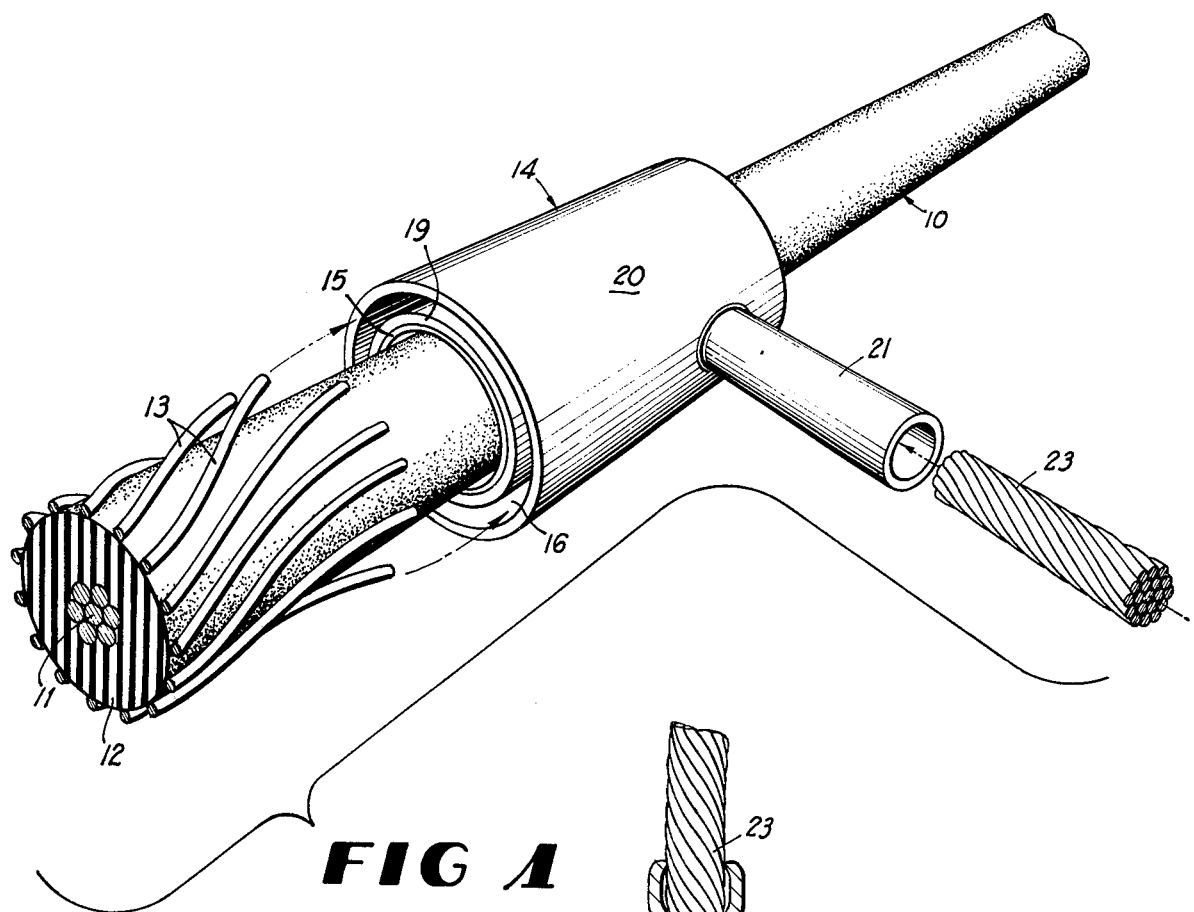
FIG. 1 is a fragmentary exploded perspective view of the invention.

Referring to the drawings in detail, wherein like numerals designate like parts, the numeral 10 designates a typical residential underground distribution cable having a central high potential conductor 11 which may be formed of aluminum and encapsulated within an insulation body 12 of polyethylene or the like. A grounded neutral conductor 13 is applied helically, as indicated, to the exterior of the insulation body 12 and may consist of a bare tinned-copper wire or equivalent element.

The invention comprises a terminator and grounding unit for the two conductor cable 10 and includes a deformable metal sleeve 14 having a bore lined by a rigid steel tube 15, suitably fixed therein and providing a passageway for the cable 10. The steel tube 15 resists complete crushing of the deformable metal sleeve 14.

The sleeve 14 is provided in one end with an axially deep annular slot or chamber 16 which terminates in an end wall 17 well short of the opposite closed end of the sleeve so as to provide a relatively thick solid sleeve portion 18. The annular slot 16 lies between spaced inner and outer coaxial annular wall portions 19 and 20 of the sleeve 14.

A side radially extending and comparatively small diameter deformable metal tube 21, or gripper, is fixedly secured as at 22 to the exterior of solid sleeve portion 18. The sleeve 14 and side gripper 21 are shown in FIG. 1 prior to deformation by a clenching or pinching implement and are shown in FIG. 2 following deformation by such an implement.

Figure 2:
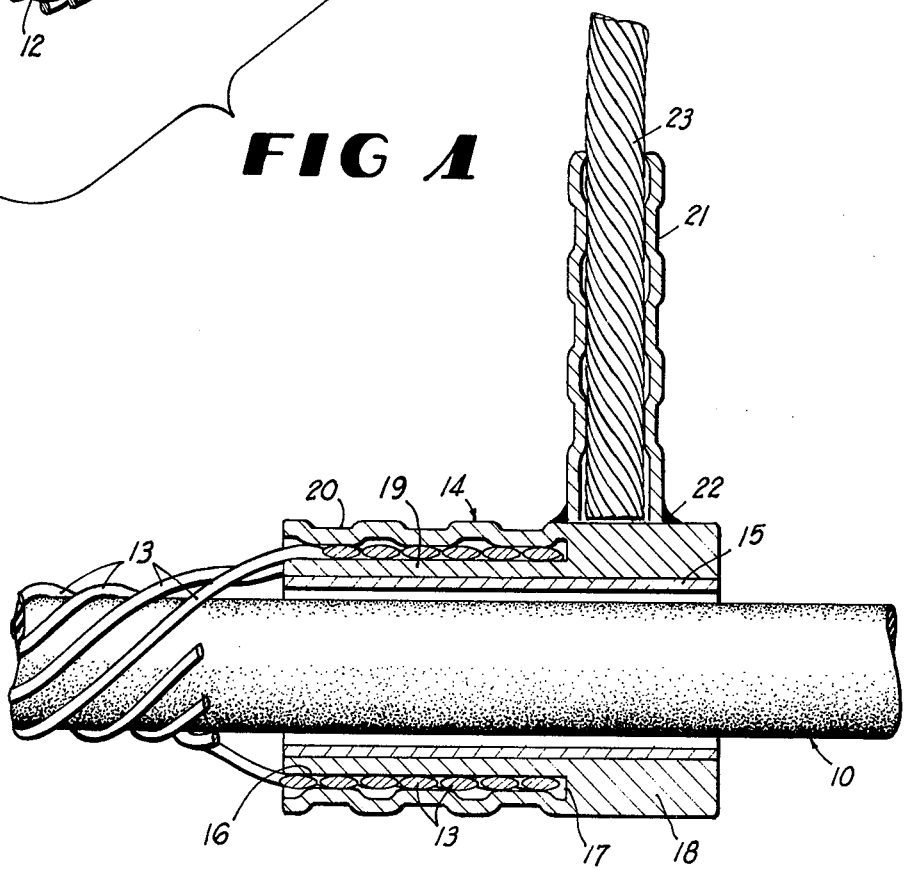
FIG. 2 is a central vertical cross section through the invention with elements broken away.

In the use of the invention, the helical conductor 13 has its strands introduced into the annular slot or chamber 16 for the full depth of such slot and the sleeve 14 is then pinched and deformed onto the grounded neutral conductor, as depicted in FIG. 2. The resulting connection is mechanically secure and stable with a high degree of electrical integrity.

Similarly, an extrinsic ground conductor 23 is introduced into the side tube 21 or gripper and preferably bottomed therein, following which the gripper is pinched and deformed around the conductor 23 as clearly illustrated in FIG. 2 to provide a secure mechanical and electrical connection.

The overall terminator and grounding unit is compact and clean in design, extremely durable and convenient to use. The rigid steel liner 15 is an important feature which prevents crushing or possible destruction of the deformable sleeve by excessive pressure. The ideal suitability of the invention for terminating two conductor underground distribution cables having a concentric neutral is believed to be apparent from the foregoing description.

It is to be understood that the form of the invention herewith shown and described is to be taken as a preferred example of the same, and that various changes in the shape, size and arrangement of parts may be resorted to, without departing from the spirit of the invention or scope of the subjoined claims.

We claim:

1. A terminator and grounding unit for a cable having a central insulated conductor and an external concentric bare neutral conductor, said unit comprising a deformable metal sleeve to receive said insulated conductor and having an annular side wall chamber formed in one end thereof and terminating deeply within the sleeve for receiving said concentric neutral conductor, whereby the sleeve may then be externally pinched to lock the concentric neutral conductor firmly in said chamber, and a side radially extending deformable metal tube on said sleeve adapted to receive an extrinsic ground conductor and to be pinched thereon to lock the ground conductor securely within said tube.

2. A terminator and grounding unit as defined in claim 1, and said sleeve having a comparatively short solid portion at its end away from said chamber, and said side metal tube being joined to said solid portion.

3. A terminator and grounding unit as defined in claim 1, and a substantially rigid liner within the bore of said deformable metal sleeve to resist crushing and destruction thereof during pinching of the exterior of the sleeve on said concentric neutral conductor.

4. A terminator and grounding unit as defined in claim 3, and said rigid liner comprising a steel tube fixed within the bore of said deformable metal sleeve.